United States Patent
Wax et al.

(10) Patent No.: US 6,249,680 B1
(45) Date of Patent: Jun. 19, 2001

(54) RADIO TRANSMITTER LOCATION FINDING IN CDMA WIRELESS COMMUNICATION SYSTEMS

(75) Inventors: Mati Wax, San Ramon; Oliver Hilsenrath, Alamo; Abraham Bar, Palo Alto, all of CA (US)

(73) Assignee: U.S. Wireless Corporation, San Ramon, CA (US)

( * ) Notice: Subject to any disclaimer, the term of this patent is extended or adjusted under 35 U.S.C. 154(b) by 0 days.

(21) Appl. No.: 09/152,916

(22) Filed: Sep. 14, 1998

Related U.S. Application Data (63) Continuation-in-part of application No. 08/966,466, filed on Nov. 7, 1997, which is a continuation-in-part of application No. 08/780,565, filed on Jan. 7, 1997.

(51) Int. Cl.[7] ........................................... H04Q 7/20
(52) U.S. Cl. .................... 455/456; 455/440; 455/457; 370/335
(58) Field of Search ..................... 455/456, 457, 455/422, 440, 560, 562; 342/378, 453, 457, 450; 340/825.36, 825.49; 370/334, 335, 342, 441, 479, 515; 375/142, 150

(56) References Cited

U.S. PATENT DOCUMENTS

| | | | |
|---|---|---|---|
| 4,799,062 | 1/1989 | Sanderford, Jr. et al. | 342/450 |
| 5,508,707 | * 4/1996 | LeBlanc et al. | 342/457 |
| 5,570,412 | 10/1996 | LeBlanc | 379/58 |
| 5,602,903 | 2/1997 | LeBlanc et al. | 379/60 |
| 5,634,199 | 5/1997 | Gerlach et al. | 455/63 |
| 5,712,899 | * 1/1998 | Pace, II | 455/456 |
| 5,722,083 | * 2/1998 | Konig | 455/517 |
| 5,835,857 | * 11/1998 | Otten | 455/410 |
| 5,909,471 | * 6/1999 | Yun | 375/343 |
| 5,945,948 | * 8/1999 | Buford et al. | 342/457 |
| 6,026,304 | * 2/2000 | Hilsenrath et al. | 455/456 |
| 6,084,546 | * 7/2000 | Wax et al. | 342/478 |
| 6,108,557 | * 8/2000 | Wax et al. | 455/456 |

* cited by examiner

Primary Examiner—Nay Maung
Assistant Examiner—Sonny Trinh
(74) Attorney, Agent, or Firm—Lumen IPS, Inc (57) ABSTRACT

A method and apparatus for location finding in a CDMA wireless communication system uses multipath signals in order to accurately determine a transmitter—s location. Direct path and multipath signals from a mobile transmitter arrive at an array of p antennas belonging to a cellular network base station. A location finding apparatus connected to the base station contains a multichannel receiver that uses PN sequence information provided by the base station receiver to despread the p signals and to separate each of the p signals into temporally distinct multipath parts. A signal processor calculates a signal signature for each active mobile. The signature is comprises a code correlation function, a set of temporal delays corresponding to the multipath parts and a set of signal subspaces. The signature is then compared to a database of calibrated signal signatures and corresponding locations, and a location whose calibrated signature best matches the measured signature is selected as the most likely location of the mobile transmitter. The location information can be used to increase the performance of a cellular telephone network and/or to provide useful services to cellular telephone customers.

13 Claims, 7 Drawing Sheets

RADIO TRANSMITTER LOCATION FINDING IN CDMA WIRELESS COMMUNICATION SYSTEMS

This application is a continuation-in-part of U.S. patent application Ser. No. 08/966,466 filed Nov. 7, 1997, which is a continuation-in-part of U.S. patent application Ser. No. 08/780,565 filed Jan. 7, 1997, both of which are incorporated herein by reference.

FIELD OF THE INVENTION

This invention relates generally to methods for passively determining the location of a radio transmitter. More particularly, it relates to methods for determining the location of cellular telephones, especially in severe multipath urban environments, and applications of such methods to CDMA cellular telephone networks.

BACKGROUND OF THE INVENTION

Desirability of Location Information

A long standing problem in radio communications is accurately determining the location of a mobile radio transmitter. Precise location information in a cellular telephone network is desirable for various reasons that have been recognized in the prior art. These applications of location information have yet to be realized in urban environments, however, because no practical method of providing accurate location information has yet been developed.

Multipath as the Primary Problem in Location Finding

Figure 1:
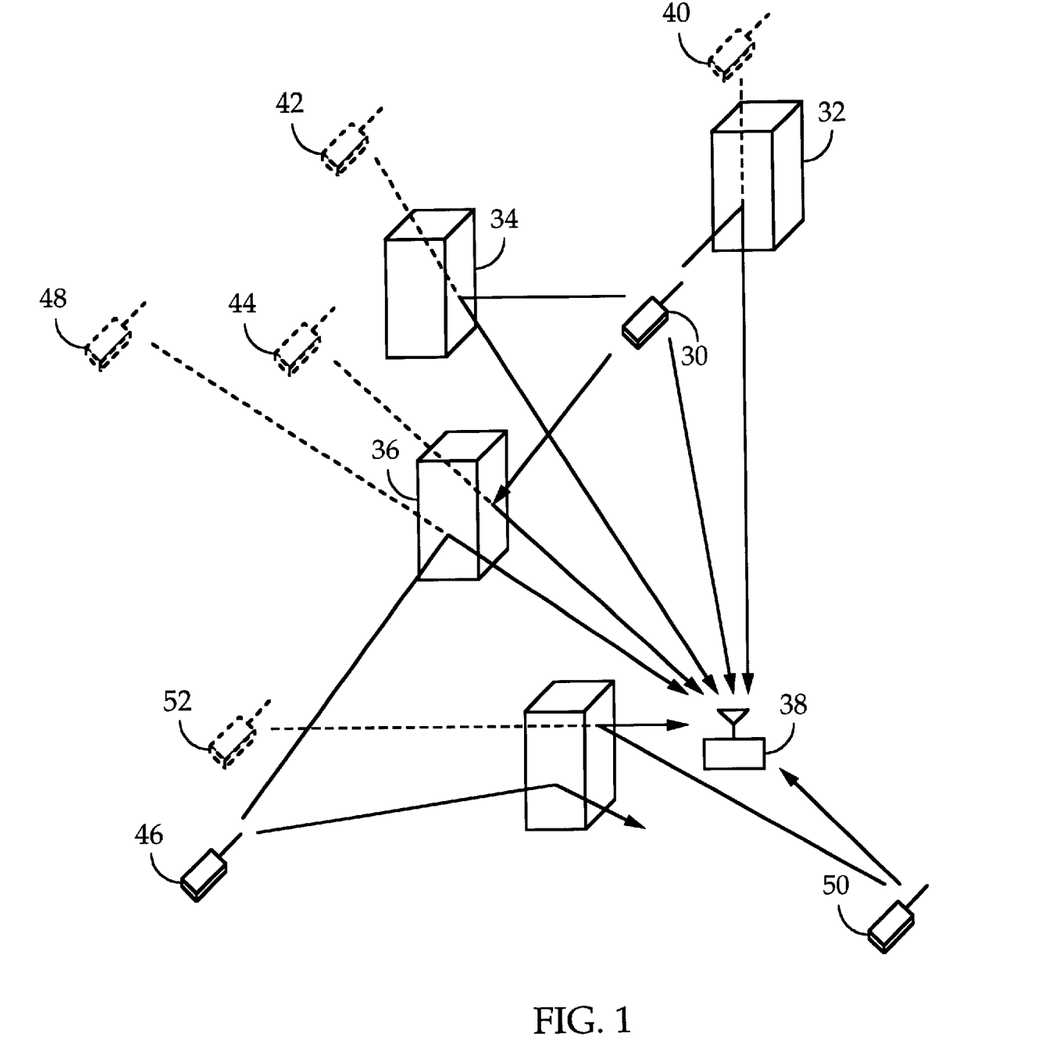
FIG. 1 shows several phones and a base station in a typical urban environment where severe multipath is present.

Multipath is the greatest source of error in prior art methods of location finding. As shown in FIG. 1, multipath is typically caused by the reflection of signals from objects in the environment, such as buildings, hills, and other structures. A signal transmitted from a cellular phone 30, for example, is reflected from structures 32, 34, and 36, resulting in three multipath signals arriving at a base station 38 in addition to a direct path signal. The multipath signals not only have different directions from the direct signal, but different delays as well. As a result, multipath is a problem for location-finding systems based on direction finding, and those based on time-of-arrival measurements. For example signals from phone 30 arrive at base station 38 from different directions and with different delays, with the result that three additional cellular phones 40, 42, and 44 appear to be transmitting similar signals from different directions and at different distances. In some cases, signals from a phone 50 can arrive at base station 38 from nearly opposite directions, one from actual phone 50 and another from an apparent phone 52. In urban environments, often no direct path exists and the base station receives only multipath signals. For example, phone 46 has no direct path signal to base 38. Consequently, it appears from base 38 that a unique signal is originating from an apparent phone 48 which has a very different location from actual phone 46. Clearly, multipath significantly complicates the communication of signals, and, in particular, complicates the problem of accurately determining the true location of a transmitter. Since a large proportion of cellular phone usage is in urban environments which have severe multipath, it is especially important to solve this problem. All prior art methods, however, have failed to provide consistent and accurate location information in multipath environments.

Prior Art Location Finding Techniques

Figure 2:
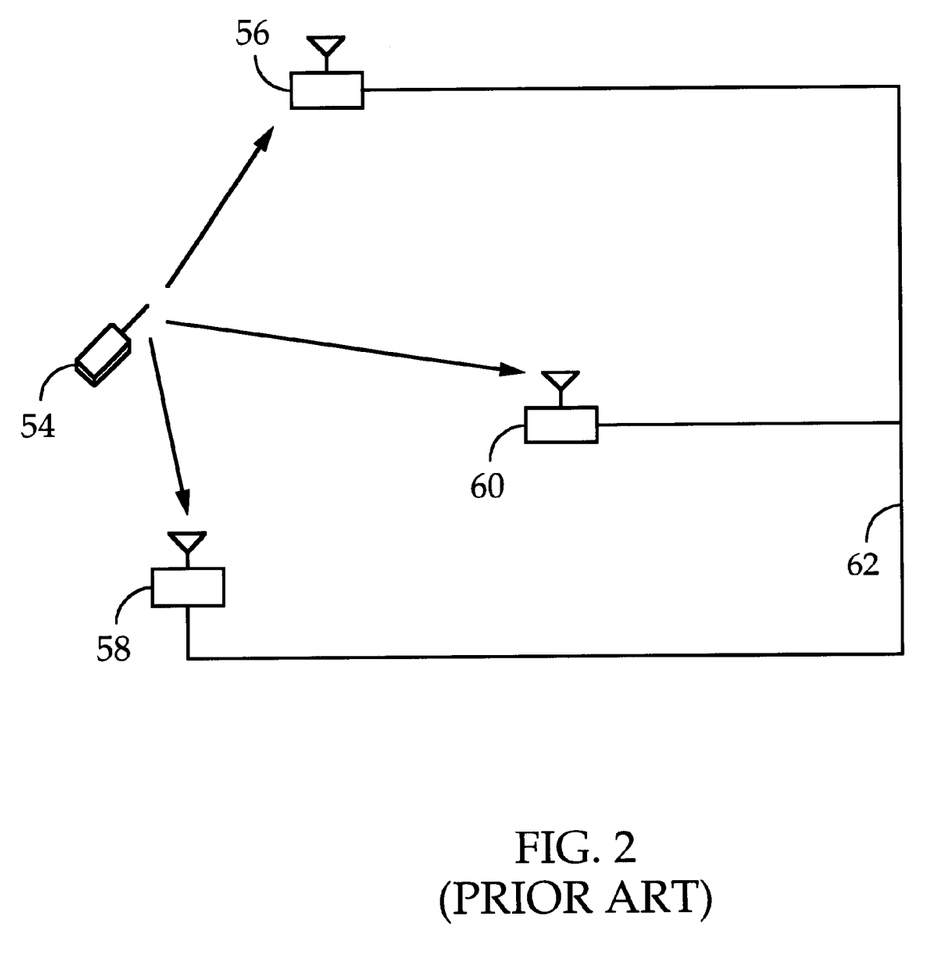
FIG. 2 illustrates a prior art method of locating phones based on temporal information shared between multiple base stations.

As illustrated in FIG. 2, a common prior art approach to determining the position of a mobile phone 54 involves measuring temporal information, e.g. time of arrival (TOA) or time difference of arrival (TDOA), at three or more synchronized base stations 56, 58, and 60. By communicating this temporal information between the base stations over a communication line 62, the transmitter location can be determined. In more sophisticated time-based approaches, handshaking protocols are used in conjunction with time delay measurements.

These methods have the disadvantage that signals from cellular phone 54 must be received by several base stations 56, 58, and 60 at the same time. In many circumstances, however, the phone 54 is only within the range of one or two base stations. Additionally, expensive high accuracy clocks are required at the base stations and expensive high bandwidth communication lines 62 are required between the base stations in order to allow accurate temporal correlation of their received signals from phone 54. More significantly, this approach encounters serious difficulties in urban environments since there is, in most cases, no direct path between the mobile and the base station. Consequently, the multipath can introduce large temporal delays. Although spread spectrum techniques can reduce the effects of multipath to some extent, they cannot provide high accuracy in severe multipath environments or cases where there is no direct path signal. Consequently, these methods fail to determine positions accurately and consistently in many cases.

Although the prior art does disclose several techniques for location finding that attempt to mitigate multipath effects, they all fail in the presence of severe multipath and when there is no direct path signal. These techniques are all characterized by an attempt to cope with multipath by circumvention or discrimination of multipath signals from direct path signals. In cases of severe multipath, however, there often is no direct path signal at all. In such cases, these approaches fail. Moreover, averaging techniques are based on assumptions about the distribution of multipath that are not generally valid, especially in severe multipath environments. Even in cases where such assumptions do hold, these averaging techniques do not yield accurate position information.

Figure 3:
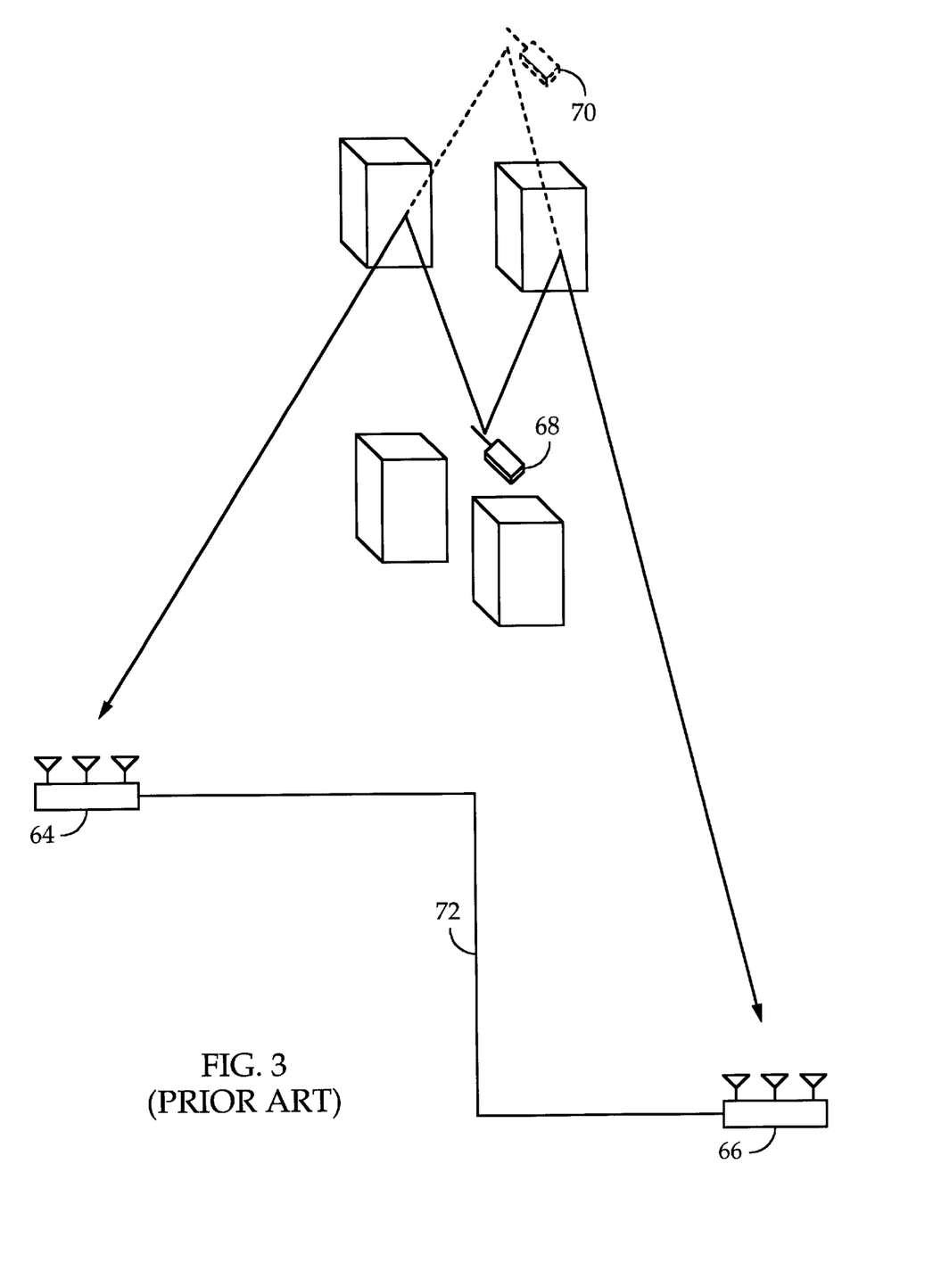
FIG. 3 illustrates a prior art method of locating phones based on direction finding from multiple base stations.

As illustrated in FIG. 3, another prior art approach determining the location of a phone 68 makes use of antenna arrays 64 and 66 for direction finding. For example, U.S. Pat. No. 5,515,378 to Roy, III et al. discloses a method and apparatus for estimating positions and velocities of mobiles from antenna array measurements of their signals. When an estimate of location is made based only on the directional information from a single base station, such an estimate has a very poor accuracy. To obtain more accurate location estimation, the DOA parameters must be supplemented by TOA measurements and/or parameter measurements sent over a communication line 72 from other base stations. Even in this case, however, the estimates are still not sufficient to accurately determine a correct location since a direct path may not exist at all, as in severe multipath environments. For example, since no direct path exists from phone 68 to either base station 64 or 66, phone 68 will appear to be located at the location of a false phone 70.

U.S. Pat. No. 4,799,062 to Sanderford, Jr. et al. proposes an approach to location finding using a differential multipath signal technique. They point out that when the positions of two mobiles are close to each other, their multipath signals should be nearly the same. Consequently, if a reference signal from a known transmitter location near the mobile were subtracted from the mobile's signal, the multipath effects should cancel and the differential position between the two could be determined. The patent, however, does not disclose in detail how such a method might be implemented. Moreover, in severe multipath environments the approach of Sanderford fails. Since the multipath components of the signal can change significantly over distances on the order of 30 meters or less, the differential position will be accurate only in cases where the phone is already within sight of the mobile, therefore defeating the purpose of the technique. Even in cases of less severe multipath, the technique is unattractive to implement due to the need for a reference signal from a nearby transmitter having a known location.

LeBlanc et al. in U.S. Pat. No. 5,602,903 discloses a method for determining the location of a mobile by making RF measurements, such as signal strength, error rate, and signal quality, then comparing these measurements with a database of similar measurements made when the receiver was at a known location. The disclosed method, however, suffers from the disadvantage that it requires the measurement of information at multiple base stations to determine location. Because the RF measurements that are measured by the method are only weakly correlated with position, measurements from a single base station are not sufficient to determine an accurate location.

Adaptive Array Techniques

Other more recent work in mobile communications has attempted to cope with severe multipath, albeit not for location determination applications. For example, U.S. Pat. No. 5,634,199 to Gerlach et al. discloses a base station beamforming method which uses feedback from a mobile to determine a characteristic subspace of the mobile's instantaneous channel vector. Although the instantaneous channel vector can change rapidly in a strong multipath environment, Gerlach et al. point out that it is normally restricted to a characteristic subspace that is much more stable in time. By tracking this channel subspace rather than the channel vector, much lower feedback rates are required. A collection of instantaneous channel vectors are measured, and the sum of their outer products is taken to produce a channel matrix. The eigenvectors having large eigenvalues define a subspace of this matrix which is a more stable representation of the receiver's channel. This subspace is then used for downlink beamforming at the base station to minimize crosstalk and maximize the desired signal at the mobiles. Although this approach reduces the amount of feedback required for beamforming in severe multipath environments, it does not have obvious application to location finding.

CDMA and Spread Spectrum Techniques

Code division multiple access (CDMA) is a spread spectrum wireless digital communication technique that enjoys some reduction in the effects of multipath. In contrast to earlier FDMA techniques that assign users to narrow frequency channels in the band, CDMA does not limit individual users to narrow frequency channels but spreads them all throughout the frequency spectrum of the entire band. Signals sharing the band are distinguished by assigning them different pseudonoise (PN) digital code sequences. The well-known correlation receiver uses this known signal structure to decompose multipath parts, provided they are separated in time by at least one chip. The different parts can then be recombined using a RAKE receiver to improve signal strength. Although this technique helps reduce the effects of multipath on signal fading, it does not provide any location information. Because CDMA systems are becoming more widespread, there is a particular need for accurate location finding techniques in wireless communication systems based on CDMA.

OBJECTS AND ADVANTAGES OF THE INVENTION

Accordingly, it is a primary object of the present invention to provide a method for accurately determining the position of a mobile radio transmitter in a CDMA communication system, even in severe multipath environments. It is another object of the invention to provide such a method for location finding that requires only a single base station. Another object of the invention is to provide for the realization of many cellular network services and management applications that have heretofore been unattainable due to the absence of accurate and consistent location finding techniques.

It is another object of the invention to provide a system for tracking and locating all cellular telephone traffic from a single base station. It is also an object to provide such a system that does not require a calibrated antenna array, does not require the phones to be responsive or cooperative, and does not require line-of-sight communication between the array and the phones. These and other advantages will become apparent from the following description and accompanying drawings.

SUMMARY OF THE INVENTION

In contrast with all prior art location finding methods which attempt to eliminate or avoid multipath signals, the present invention advantageously uses multipath signals in order to accurately determine a transmitter's location. More specifically, signals from a mobile transmitter are sent to an antenna array of a base station receiver which is part of a wireless communication system such as a CDMA cellular telephone network. Based upon the signals received at the antenna array, the base station determines a signal signature. In general, the signal signature is any location-dependent feature derived from the set of direct and multipath signals received at the antenna array of a single base station from a transmitter at a given location. The signature may be derived from any combination of amplitude, phase, delay, direction, and polarization information of the signals. In addition, the signature may also be derived in part from information provided by the receiver code correlator. Preferably, the signature is substantially invariant with respect to all variables unrelated to transmitter position, such as noise. One embodiment of the invention includes decomposing multipath parts of a user signal, where the time delay between each part is greater than one chip. For each part, referred to as a finger, a spatial subspace of an array covariance matrix is determined. The embodiment also includes measuring, for each of the signals from the various antennas, the output of the code correlator as it searches over the whole range of time delays. This code correlation information for the user signal is combined with the subspaces and time delays of the fingers to derive the signal signature.

After the signal signature has been determined, it is then compared to a database containing similar calibrated signal signatures and their corresponding locations. In one aspect of the invention, the database of calibrated signal signatures and corresponding locations is generated by a calibration procedure in which a calibration mobile phone roams a service area of the base station. At each location a signal signature of the mobile is associated with GPS location data of the mobile. The information is processed and stored in a database. A mobile having an unknown location can then be located by searching such a database and identifying a location whose calibrated signature best matches the measured signature. The calibrated and measured signatures are compared by separately calculating the similarities between spatial, time delay, and/or correlator signatures of the measured signal and those of the calibrated signals. In this manner, the location of the transmitter can be accurately determined from a signal received at a single base station, even in a severe multipath environment. Surprisingly, in contrast to other techniques of location finding, the present technique is characterized by improved accuracy in multipath environments. The invention, therefore, provides a unique and surprising solution to the location finding problem which has heretofore remained unsolved. Moreover, the present invention provides a method of location finding which, in contrast to other methods, can accurately determine a location from a single base station. This feature of the invention distinguishes it from prior techniques which either require multiple base stations or provide only very inaccurate or imprecise location information.

DETAILED DESCRIPTION

Although the following detailed description contains many specifics for the purposes of illustration, anyone of ordinary skill in the art will appreciate that many variations and alterations to the following details are within the scope of the invention. Accordingly, the following preferred embodiment of the invention is set forth without any loss of generality to, and without imposing limitations upon, the claimed invention.

System Overview and Signal Collection

Figure 4:
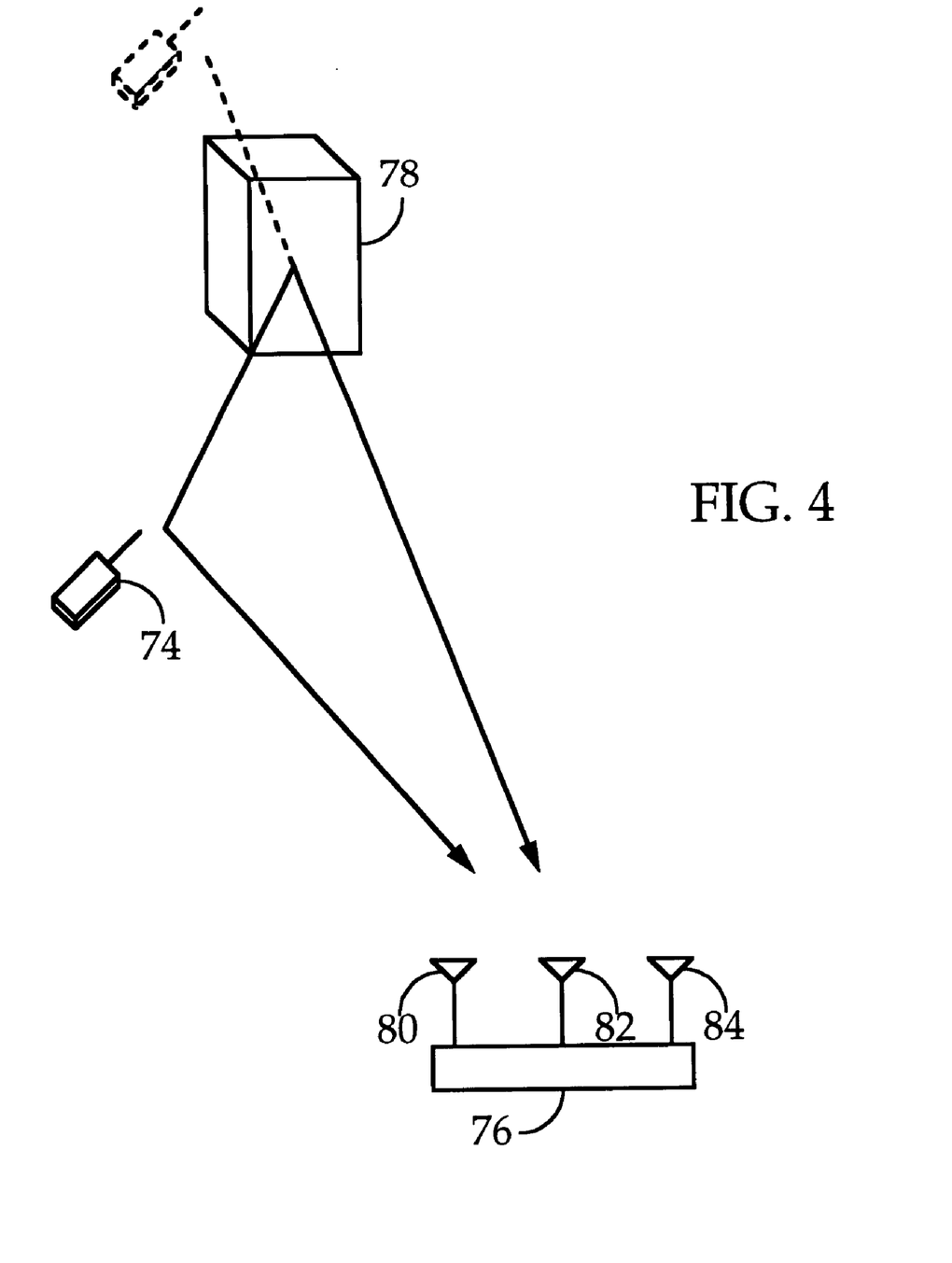
FIG. 4 illustrates a communication system according to the present invention, wherein a phone may be located within a multipath environment.

In a communication system according to a preferred embodiment of the invention, a cellular telephone 74 transmits a signal which travels through an environment and couples to an array of antennas 80, 82, 84 of a cellular telephone base station 76, as shown in FIG. 4. In general, the base station has a number p of antennas forming an array. For illustrative purposes, however, the array is shown in FIG. 1 as having three antennas. Note that more than p antennas may be physically present at the base station, and sectoring techniques can be used to dynamically select the p antennas from which signals are received.

Typically, in addition to a direct path signal from phone 74 to base 76, there may be additional multipath signals reflected from various environmental objects, for example, a multipath signal reflected from object 78. In the preferred embodiment, the communication system employs various conventional CDMA techniques and protocols. For example, the system may use the IS-95 standard, although those skilled in the art will appreciate that the invention is not limited to any particular CDMA standard. In a CDMA communication system, all users share a common frequency band, and the different mobile phones are distinguished by their use of distinct PN spreading sequences. The signals from a phone 74 are coupled to antennas 80, 82, 84, downconverted to IF, and then digitized. The digitized signals are then correlated with PN sequences in order to separate the signals from different mobile phones. Low cross-correlation between the unique PN sequences ensures that there is little interference between mobiles within the base station service area. Well-known timing synchronization techniques are used to identify and lock onto the PN sequence for each mobile. After it has been separated, the user signal is typically sent into an inverse Hadamard transformer in order to extract Walsh symbols from the signal. Various decoding and interleaving functions may also be performed in order to reconstruct the information signal originating at the mobile phone, as is well known in the art.

Figure 5:
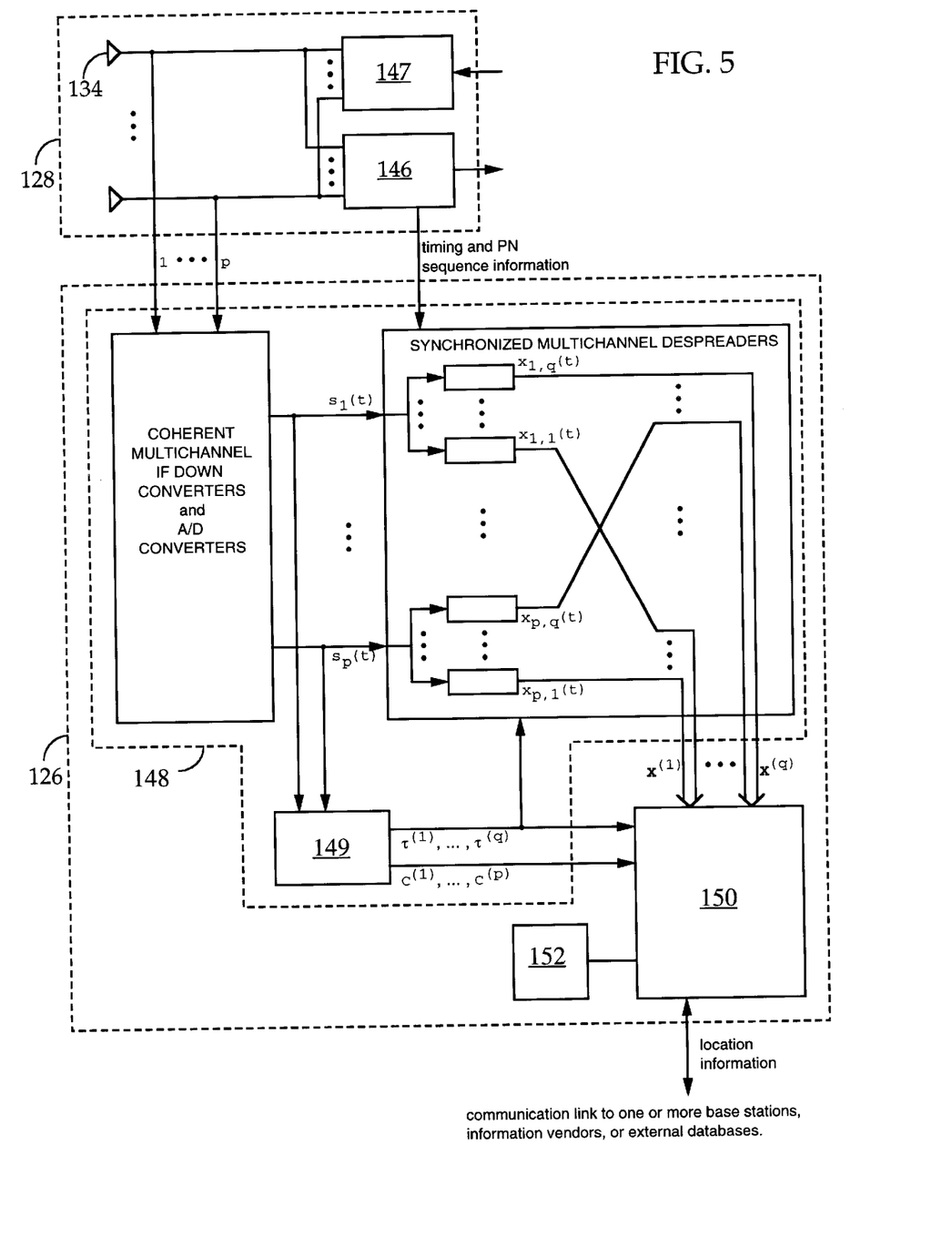
FIG. 5 is a block diagram of the major components of a location finding apparatus of the present invention in connection with an existing base station.

As shown in FIG. 5, a location finding apparatus 126 according to the present invention is connected to the existing base station 128 which comprises a base station receiver 146 and a base station transmitter 147. Apparatus 126 includes a multichannel receiver 148 which receives signals from the antennas 134. The signals are sent to multi-purpose signal processor 150 which performs signature extraction, signature matching, tracking, and other processing as required. A memory device 152 is accessible by processor 150 and is used to store signal signature calibration data, location data, geographical map data, and/ or other data as required. Existing antennas 134 at base station 128 are also coupled to location finding device 126. In particular, the p antenna signals are coupled to coherent multichannel IF down-converters and A/D converters to produce digitized complex signal samples $s_1(t), \ldots, s_p(t)$. Down-conversion and digitization are performed coherently so as to preserve the phase relationships between the separate signals from the p antennas. A common local oscillator and a master clock are used to maintain coherence between the parallel functions performed on all the signals from the p antennas.

Using synchronized multichannel despreaders, the p signals are separately despread in receiver 148 using PN sequence information provided from the base station receiver 146. In contrast with the base station receiver 146 which simultaneously performs despreading for all mobiles being served, the receiver 148 of the location finding system 126 sequentially time samples the signals from the set of current mobiles, thereby dramatically reducing hardware requirements and cost. To perform this sequential despreading, accurate code timing information is required. This information can be obtained from base station receiver 146. Alternatively, the code timing information can be acquired and tracked by the location finding receiver 148 using well known techniques.

As is well known in the art, a conventional CDMA receiver can isolate any two multipath parts of a signal if their differential delay is more than one chip length. The signal parts are extracted by "fingers" of the receiver and then combined after temporal alignment to get improved signal strength. Each finger comprises a correlation receiver matched to the exact delay associated with a particular multipath part. Note, however, that this technique does not distinguish spatially distinct multipath signals that have similar temporal delays.

Spatial, Temporal and Correlation Signature Calculation

The present system adapts the above technique for separating multipath parts in order to provide refined discrimination in location finding. In the present system, the signal transmitted from a given mobile gives rise to p received signals, each of which is then decomposed using q correlation receivers into q temporally distinct signals $x_{j,1}(t), \ldots, x_{j,q}(t)$, where j is the antenna index of the signal and q is the number of fingers used. Thus, a total of p×q correlation receivers are used. In the preferred embodiment q=4. The multipath parts contained within a given finger all have delays within one chip from each other, while the delays between fingers are more than one chip. Each set of p samples from a given finger i forms a p-dimensional vector $x^{(i)}(t)=[x_{1,i}(t), \ldots, x_{p,i}(t)]^T$. All q vectors $x^{(1)}, \ldots, x^{(q)}$ are then sent to a signal processor 150 for subspace determination, as will be described further below.

Figure 7:
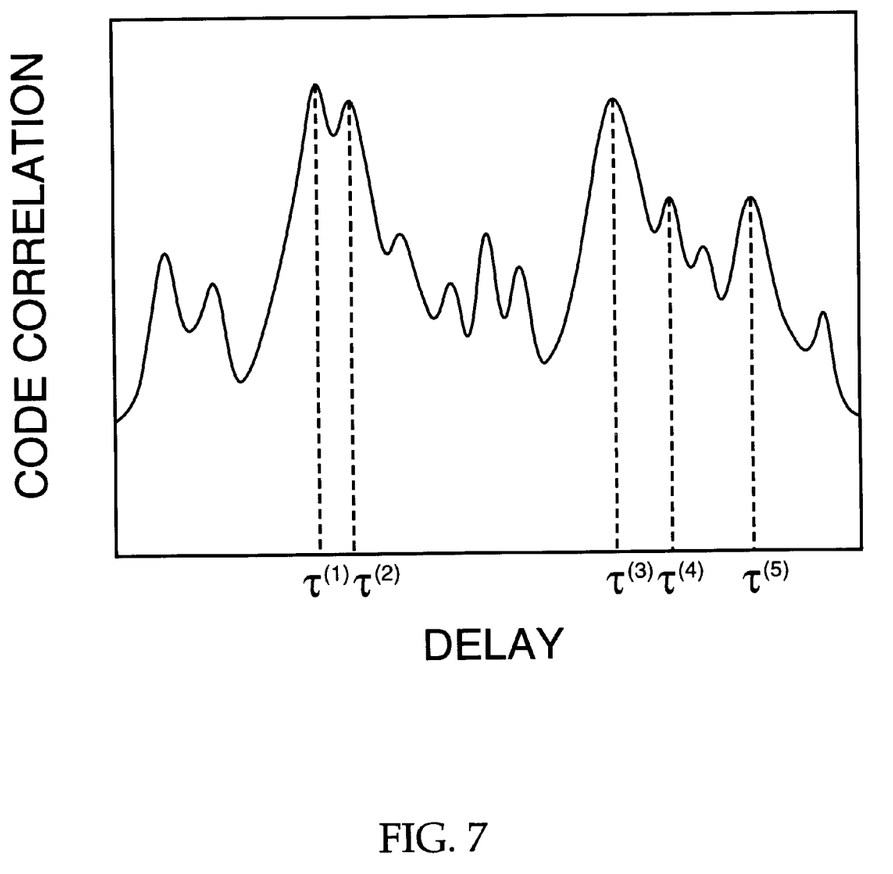
FIG. 7 is a graph of a typical output of a code correlator, indicating several time delays. According to the present invention, both the time delays and the graph itself may be used for location determination.

The CDMA receiver 148 contains a searcher 149 that searches the signals $s_1(t), \ldots, s_p(t)$ for the best code delays to be used by the despreaders. The searcher produces a code correlation output that represents the degree to which the delayed code matches the incoming signals. A typical correlation output is shown in FIG. 7. A number L of sequential correlation values are collected for a sequence of delay values $\tau_1, \ldots, \tau_L$ differing by ½ chip length. Typically, L is approximately 200. The sequence of correlation values for the signal from the $j^{th}$ antenna may be represented as a sequence $C^{(j)}(\tau_1), \ldots, C^{(j)}(\tau_L)$, where $C^{(j)}(\tau_i)$ is the value of the correlation between the signal $s_j(t)$ and a code with temporal delay $\tau_i$. The correlation output sequences for all p signals are sent to the signal processor 150 for construction of the correlation signature. In one embodiment, the correlation signature is represented as a vector defined by $C=[C^{(1)T}, \ldots, C^{(p)T}]^T$, where $C^{(j)}=[C^{(j)}(\tau_1), \ldots, C^{(j)}(\tau_L)]^T$.

The searcher 149 examines the code correlation output to determine a set of q time delays $\tau^{(1)}, \ldots, \tau^{(q)}$ which correspond to the strongest correlations. There are various well known methods of determining such time delays. For example, these time delays may be determined by selecting the q values of $\tau$ that correspond to the q largest local maxima in the set $\{C^{(j)}(\tau_i): j=1, \ldots p; i=1, \ldots, L\}$. Some examples of local maxima at delays $\tau^{(1)}, \ldots, \tau^{(5)}$ are shown in FIG. 7. Once these delays are determined, they are then sent to the despreaders to control the despreading of each of the q fingers corresponding to these delays. The delays are also sent to the processor 150 for signature determination. In one embodiment, the time delay signature is represented as a vector defined by $\tau=[\tau^{(1)}, \ldots, \tau^{(q)}]^T$.

It is also possible to implement the techniques of the present invention using improved techniques for temporal resolution. For example, using the approach proposed by Kostic et al. in U.S. Pat. No. 5,648,983, finer temporal resolution is possible. In some cases, the temporal resolution may be sufficiently fine to reduce the number of multipath parts per finger to just one.

Subspace Calculation From Sampled Signals

As will be described in detail below, a subspace $U^{(i)}$ is determined from the signals corresponding to each finger i and then these q subspaces $U^{(1)}, \ldots, U^{(q)}$ are used to form a spatial signature for the mobile.

In the preferred embodiment, a batch of signals is collected every 60 ms for a given mobile in a time interval of length 1.25 ms. Thus, up to 48 different mobiles can be sampled in the 60 ms interval. Obviously, more mobiles can be handled by either decreasing the 1.25 ms batch interval length, or increasing the 60 ms repetition interval. Alternatively, one can also use a non-uniform sampling scheme wherein each mobile is sampled at a period inversely proportional to the speed of its physical movement. In another alternative, rather than using periodic sampling and sequential processing, the hardware can be duplicated so that several mobiles are processed in parallel rather than sequentially. These various implementations involve consideration of various trade-offs, but do not alter the essential technique of the present invention. In any case, over the course of a few seconds, a collection of M×q batches are collected for each mobile, where M is on the order of 100.

The signal batches corresponding to each finger i are used to determine a spatial subspace for the finger. These spatial subspaces are combined with the corresponding temporal delays and code correlation functions to form a signature for the mobile. A signal subspace is determined from the data by one of several techniques that are well-known in the art. According to one method, a p×p covariance matrix for each batch in a finger i is formed from the outer products of the sampled vectors in the batch, and the resulting M covariance matrices are averaged to yield an average covariance matrix for the finger. The covariance matrix for the $i^{th}$ finger, $R^{(i)}$ is obtained by scaling the average covariance matrix such that $Tr\{R^{(i)}\}=1$. The eigenvalues of $R^{(i)}$ whose magnitudes exceed a predetermined threshold determine a set of dominant eigenvectors. The signal subspace for the finger is the space spanned by these dominant eigenvectors. The dominant eigenvectors can be defined as the eigenvectors of $R^{(i)}$ corresponding to the the largest eigenvalues that collectively capture at least certain amount, e.g. 90%, of the total signal energy.

Denote the subspace for a given finger i by $U^{(i)}$. It should be noted that each multipath signal in a finger i normally contributes an extra dimension to the subspace $U^{(i)}$. Consequently, the subspace will have an increased dependence upon location in the presence of severe multipath.

Calibration Procedure for Collecting Location/Signature Data

In a preferred embodiment of the invention, the location of a transmitter is determined through the use of a database containing N calibrated signal signatures and associated locations, as shown in TABLE 1. The locations $d_1, \ldots, d_N$ may be two or three dimensional The signal signature in the database for each location $d_k$ includes the calibrated spatial signature $S_k = \{U_k^{(1)}, \ldots, U_k^{(q)}; R_k^{(1)}, \ldots, R_k^{(q)}\}$, the calibrated temporal delay signature $\tau_k = [\tau_k^{(1)}, \ldots, \tau_k^{(q)}]^T$, and the calibrated correlation signature $C_k = [C_k^{(1)T}, \ldots, C_k^{(p)T}]^T$. It should be emphasized that the signal signature is not limited to the specific examples given here, but may include other characterizations as well.

TABLE 1

| Location (x, y, z) | Signal Signature | | |
|---|---|---|---|
| | Spatial Signature | Temporal Signature | Correlation Signature |
| $d_1$ | $S_1$ | $\tau_1$ | $C_1$ |
| . | . | . | . |
| . | . | . | . |
| . | . | . | . |
| $d_N$ | $S_N$ | $\tau_N$ | $C_N$ |

Figure 6:
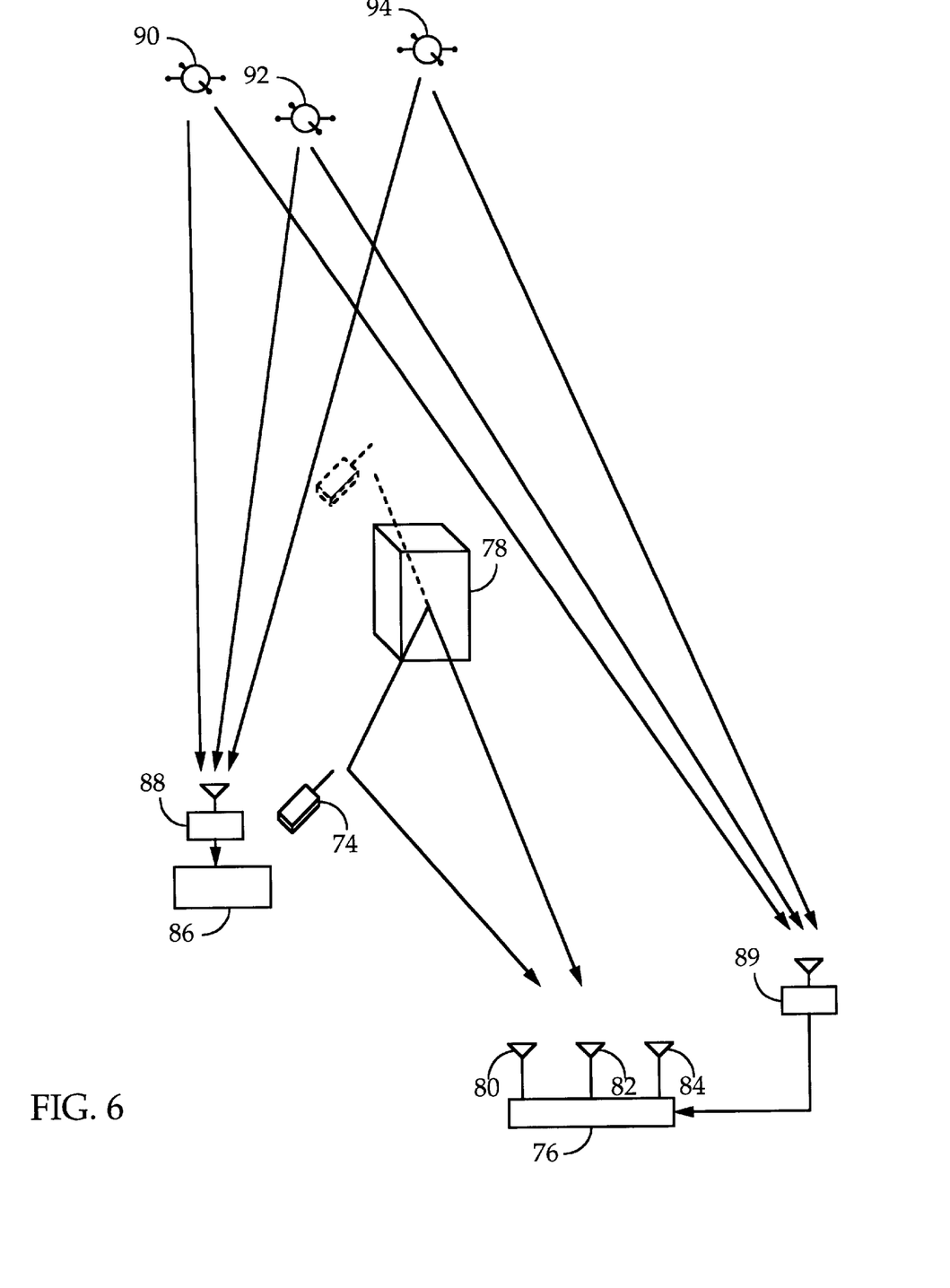
FIG. 6 illustrates a calibration phase of the present invention wherein a phone roams a service area and records its location with a GPS receiver while the base station records corresponding signature data of the phone.

Although this database may be generated by various techniques, in the preferred embodiment it is generated by an empirical calibration procedure, as follows. As shown in FIG. 6, a phone 74 roams around the service area of a base station 76. Roaming together with the phone 74 is a microprocessor, such as a common laptop computer, 86, which is connected to a global positioning system (GPS) receiver 88, which is able to determine its precise location through the reception of signals from GPS satellites 90, 92, and 94. At each location, GPS time and location data are stored in the memory of the computer for later analysis. Meanwhile, base station 76 determines the signal signatures for the mobile phone 74 and associates the signatures with GPS timing information received at its own GPS receiver 89. Data points are collected by the mobile and the base station every few seconds as the vehicle moves throughout the service area. The repetition can be more or less frequent depending on the degree of precision desired. Upon completion of its route, the roaming mobile returns to the base and the data is combined so that the signatures measured at the base can be matched with the locations measured at the mobile. Using differential GPS correction data, the location can be determined with high accuracy. Note that the calibration procedure may include the simultaneous use of several base stations and/or several vehicles moving within the service area. The final calibration database will contain a set of signal signatures and associated locations throughout the service area of the base station.

Although the signal signature is a relatively stable function of location, certain changes in the signature may take place which may affect the accuracy of the database of calibrated signal signatures. Such changes may result from the construction or destruction of buildings, or from seasonal changes in the natural environment that affect multipath. Accordingly, the preferred embodiment of the present invention includes techniques for updating the database. A direct method involves performing the calibration procedure at regular intervals or continuously. A cost-effective method of continuous calibration could use a fleet of commercial delivery vehicles. Since such vehicles typically pass through many locations in a localized region, a dedicated calibration system could piggy-back on these vehicles and allow continuous updating of the database. Alternatively, or in addition, specialized vehicles could be sent out periodically to calibrate the service region It should also be noted that in the case where two or more base stations can simultaneously receive signals from such a calibration unit, its signals can be used by all these base stations to independently calibrate their respective databases.

Real-Time Location Determination and Ambiguity Resolution

In the preferred embodiment, the location of a phone in the service area may be determined as follows. Signals originating from a phone 10 at an unknown location are received at the base station 12 by multichannel receiver 26. The signal processor 28 at the base station then determines the signal signature as described in detail above. In one embodiment of the invention, the signal spatial signature $S=\{U^{(1)}, \ldots, U^{(q)}; R^{(1)}, \ldots, R^{(q)}\}$ is the set of finger covariance matrices and their subspaces derived from the received signal. Using the calibration table described above, the signal signature is then compared using a measure of similarity to a set of calibrated signal signatures which correspond to a set of N calibrated locations.

The measure of similarity between the measured spatial signature and a given calibrated spatial signature may be determined by evaluating a function D which maps two signatures to a number indicating their degree of closeness to each other. The value of $D(S,S_k)$ represents the likelihood that a measured spatial signature $S=\{U^{(1)}, \ldots, U^{(q)}; R^{(1)}, \ldots, R^{(q)}\}$ matches a calibrated signature $S_k=\{U_k^{(1)}, \ldots, U_k^{(q)}; R_k^{(1)}, \ldots, R_k^{(q)}\}$. Because each signature $S_k$ corresponds to a known location $d_k$, $D(S,S_k)$ also represents the likelihood that the transmitter is at location $d_k$. The value of $D(S,S_k)$ can be, for example, the sum of the traces of the projections of the measured finger covariance matrices $R^{(1)}, \ldots, R^{(q)}$ onto the corresponding calibrated subspaces, which can be calculated as follows:

$$D(S, S_k) = \sum_{i=1}^{q} Tr P_k^{(i)} R^{(i)},$$

where $P_k^{(i)} = U_k^{(i)}[U_k^{(i)}]^H$ is the projector onto the subspace $U_k^{(i)}$.

In addition, the temporal code correlation for the signal, $C=[C^{(1)T}, \ldots, C^{(p)T}]^T$, can be compared with those in the calibration table. This comparison can be made using, for example, a least-squares difference measure. For example, the similarity measure between the measured correlation signature $C=[C^{(1)T}, \ldots, C^{(p)T}]^T$ and a calibrated correlation signature $C_k=[C_k^{(1)T}, \ldots, C_k^{(p)T}]^T$ may be calculated as follows:

$$D'(C, C_k) = |C - C_k|^2 = \sum_{j=1}^{p} |C^{(j)} - C_k^{(j)}|^2.$$

This results in a separate measure D' of the likelihood that the measured signal matches a given calibrated signal in the database. This separate measure can then be used in addition to D in order to improve the accuracy of the match, for example, by keeping only those locations that closely match the measured signal with respect to both code correlation and subspace measures.

Similarly, the temporal delay signature $\tau=[\tau^{(1)}, \ldots, \tau^{(q)}]^T$ of the measured signal can be compared to the calibrated temporal delay signature $\tau_k=[\tau_k^{(1)}, \ldots, \tau_k^{(q)}]^T$ to provide an additional measure D" of similarity. For example, one may calculate $$D''(\tau, \tau_k) = |\tau - \tau_k|^2 = \sum_{i=1}^{q} |\tau^{(i)} - \tau_k^{(i)}|^2.$$

This additional measure of similarity can then be used in addition to D and D' in order to further improve the accuracy of the match, for example, by keeping only those locations that closely match the measured signal with respect to all three measures. More generally, it will be appreciated that various combinations of the measures D, D', and D" can be used in various ways to select locations appropriately. It will also be appreciated that other formulas may be used to define these measures.

In one embodiment of the invention, the measures of similarity are used to select a set of most likely locations as follows. First, by evaluating D for all N locations, a set $\mathcal{D}=\{s_1, \ldots, s_M\}$ of likely locations can be selected by taking, for example, the is M locations in $\mathcal{S}$ whose corresponding calibrated spatial signatures are closest in the sense of D to the measured spatial signature. Alternatively, the set $\mathcal{D}$ of likely locations can be selected by taking those locations in $\mathcal{S}$ whose corresponding calibrated spatial signatures have a similarity (in the sense of D) to the measured signature that is greater than a certain predetermined threshold value h. That is, $\mathcal{D}=\{d_k \in \mathcal{S}: D(S,S_k) > h\}$.

Similarly, by calculating $D'(C,C_k)$ and $D''(\tau, \tau_k)$ for all N locations, corresponding sets $\mathcal{D}'$ and $\mathcal{D}''$ of likely locations can be selected. The sets 𝒟, 𝒟' and 𝒟" can be intersected to obtain a smaller set of likely locations.

Another matching technique can be used in addition to the above techniques to further improve the performance of the location finding system. To describe this technique, we first define a function $F_S$ by $$F_S(k)=D(S,S_k),$$

and a set of functions $F_{Sj}$ for $j=1, \ldots, N$ by $$F_{Sj}(k)=D(S_j,S_k).$$

The function $F_S$ characterizes how the spatial signature S compares to the entire set of calibrated spatial signatures $S_1, \ldots, S_N$. Similarly, the function $F_{Sj}$ characterizes how the spatial signature $S_j$ compares to the entire set of calibrated spatial signatures $S_1, \ldots, S_N$. Now define a measure of similarity G between a spatial signature S and a calibrated spatial signature $S_j$ by comparing the function $F_S$ with the function $F_{Sj}$.

There are many well known techniques for measuring the closeness of two functions. For example, one may define the closeness of the functions by a least-squares difference as follows:

$$G(S, S_j) = \sum_{j=1}^{N} |F_S(k) - F_{S_j}(k)|^2.$$

This measure of similarity can the be used in addition to, or instead of, the measure D as described above. Moreover, one can analogously define functions F' and F" from D' and D", respectively, to obtain functions G' and G", respectively. For example, one may define $F'_C$ by $$F'_C(k)=D'(C,C_k),$$

and a set of functions $F'_{Cj}$ for $j=1, \ldots, N$ by $$F'_{Cj}(k)=D'(C_j,C_k).$$

Then define G' by $$G'(C, C_j) = \sum_{k=1}^{N} |F'_C(k) = F'_{C_j}(k)|^2.$$

Similarly, one may define $F''_\tau$ by $$F''_\tau(k)=D''(\tau,\tau_k),$$

and a set of functions $F''_{\tau j}$ for $j=1, \ldots, N$ by $$F''_{\tau j}(k)=D''(\tau_j,\tau_k).$$

Then define G" by $$G''(\tau, \tau_j) = \sum_{k=1}^{N} |F''_\tau(k) - F''_{\tau_j}(k)|^2.$$

The functions G, G' and G" can then be used individually or together to select a set of most likely locations using techniques described above in relation to functions D, D' and D". It will be appreciated that various combinations of the measures G, G', and G" can be used in various ways to select locations appropriately. It will also be appreciated that other formulas may be used to define these measures, as well as the intermediate functions F, F', and F".

Another technique for resolving ambiguity is to combine sets of likely locations obtained from multiple base stations. Since the location information is determined independently at the separate base stations, no synchronization between base stations is necessary. Also, since the amount of information involved is small, no high speed or high bandwidth communication lines are required. The combination of the sets of likely locations reduces the ambiguity since the propagation paths of the signal to the different bases are different and, consequently, only the true location is likely to be common to all sets. As a result, this technique proves highly effective in resolving location ambiguity.

In addition to the above techniques which use additional measured information to resolve ambiguities, the preferred embodiment includes various other techniques for resolving ambiguities in the location. One technique for resolving such ambiguities is to compare likely locations with locations on a map. Assuming, for example, that a phone is most likely in a vehicle constrained to known roads, any off-road locations can be eliminated or assigned lower probabilities. Another technique for resolving ambiguity is a motion tracking system that associates sets of likely locations measured over the course of several seconds or minutes. Using realistic models about the possible changes in phone location over the course of time, the ambiguities in location can be reduced or resolved. For example, it is very unlikely that a phone that has been located in one localized region of the service area will suddenly move to another location several miles away.

It will be appreciated that the foregoing provides a system for locating all cellular telephone traffic from a single base station. The present method does not require a calibrated antenna array, does not require the phones to be responsive or cooperative, and does not require line-of-sight communication between the array and the phones.

What is claimed is:

1. In a spread-spectrum CDMA wireless communication system comprising a mobile transmitter and a receiver connected to an antenna array, a method for estimating the location of the mobile transmitter, the method comprising:
    receiving at the antenna array signals originating from the mobile transmitter;
    determining from the received signals a signal signature corresponding to the mobile transmitter, wherein the signature comprises a spatial signature and a code correlation signature;
    comparing the signal signature to a database comprising calibrated signal signatures and corresponding location data; and
    selecting from the database a set of likely calibrated signal signatures and a corresponding set of likely calibrated locations, wherein a difference between the likely calibrated signal signatures and the signal signature is minimized.

2. The method of claim 1 wherein determining the signal signature comprises correlating p received signals from the antenna array with a predetermined code to produce p code correlation outputs, and constructing the code correlation signature from the p code correlation outputs.

3. The method of claim 2 wherein comparing the signal signature to the database comprises calculating differences between the p code correlation outputs and calibrated code correlation outputs.

4. The method of claim 1 wherein determining the signal signature comprises temporally decomposing p spatially coherent signals received from the antenna array into p×q distinct signals, calculating from the p×q distinct signals a set of q covariance matrices, and constructing the spatial signature from the q covariance matrices.

5. The method of claim 4 wherein constructing the spatial signature comprises calculating from the set of q covariance matrices a set of q corresponding signal subspaces.

6. The method of claim 4 wherein comparing the signal signature to the database comprises summing traces of projections of the q covariance matrices onto calibrated signature subspaces.

7. The method of claim 1 wherein determining the signal signature comprises decomposing each of p signals received from the antenna array into q temporally distinct signals having q temporal delays.

8. The method of claim 7 wherein the signature further comprises a temporal delay signature, and wherein determining the signal signature further comprises constructing the temporal delay signature from the q temporal delays.

9. The method of claim 8 wherein comparing the signal signature to the database comprises calculating a difference between the q temporal delays and calibrated temporal delays.

10. The method of claim 1 wherein comparing the signal signature to the database comprises calculating a difference between a function F and a set of functions $F_1, \ldots, F_N$, where the function F represents differences between the signal signature and a set of N calibrated signatures, and where the function $F_j$ represents differences between a $j^{th}$ calibrated signature and the set of N calibrated signatures.

11. The method of claim 10 wherein the function F represents differences between the code correlation signature and a set of N calibrated code correlation signatures, and where the function $F_j$ represents differences between a $j^{th}$ calibrated code correlation signature and the set of N calibrated code correlation signatures.

12. The method of claim 10 wherein the function F represents differences between the spatial signal signature and a set of N calibrated spatial signatures, and where the function $F_j$ represents differences between a $j^{th}$ calibrated spatial signature and the set of N calibrated spatial signatures.

13. The method of claim 10 wherein the function F represents differences between a temporal delay signature and a set of N calibrated temporal delay signatures, and where the function $F_j$ represents differences between a $j^{th}$ calibrated temporal delay signature and the set of N calibrated temporal delay signatures.

* * * * *